(12) United States Patent
Heo et al.

(10) Patent No.: US 9,990,095 B2
(45) Date of Patent: Jun. 5, 2018

(54) TOUCH PANEL AND ELECTRONIC DEVICE HAVING THE SAME

(71) Applicant: Samsung Electronics Co., Ltd., Gyeonggi-do (KR)

(72) Inventors: Hoon-Do Heo, Gyeonggi-do (KR); Kwang-Soo Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 14/974,194

(22) Filed: Dec. 18, 2015

(65) Prior Publication Data

US 2016/0179274 A1 Jun. 23, 2016

(30) Foreign Application Priority Data

Dec. 19, 2014 (KR) .......................... 10-2014-0184765

(51) Int. Cl.
*G09G 3/36* (2006.01)
*G06F 3/044* (2006.01)
*G06F 1/16* (2006.01)

(52) U.S. Cl.
CPC ............ *G06F 3/044* (2013.01); *G06F 1/1626* (2013.01)

(58) Field of Classification Search
USPC .................................................. 345/173–174
See application file for complete search history.

(56) References Cited

U.S. PATENT DOCUMENTS

| 2011/0181543 A1* | 7/2011 | Long .................. G06F 3/044 345/174 |
| 2014/0139467 A1* | 5/2014 | Ghosh ................ G06F 3/0416 345/173 |
| 2014/0362032 A1* | 12/2014 | Mo .................... G06F 3/0412 345/174 |
| 2015/0130760 A1* | 5/2015 | Kim .................... G06F 3/044 345/174 |

\* cited by examiner

*Primary Examiner* — Roy P Rabindranath
(74) *Attorney, Agent, or Firm* — Cha & Reiter, LLC

(57) ABSTRACT

According to embodiments of the present disclosure, there are disclosed a touch panel and electronic device having the touch panel. The touch panel, comprises a first layer having a plurality of first conductive sensors disposed below a window member; and a second layer spatially separated from the first layer and having a plurality of second conductive sensors, the first conductive sensors and the second conductive sensors being respectively positioned at different locations in a plane of the touch panel, wherein the second layer is disposed below the first layer, and the both layers are disposed over a display unit or at least one of both layers are integrated with the display unit.

18 Claims, 13 Drawing Sheets

TOUCH PANEL AND ELECTRONIC DEVICE HAVING THE SAME

CLAIM OF PRIORITY

This application claims the benefit under 35 U.S.C. § 119(a) of a Korean patent application filed in the Korean Intellectual Property Office on Dec. 19, 2014 and assigned Serial No. 10-2014-0184765, the entire disclosure of which is incorporated herein by reference in its entirety, as if fully set forth herein, for all purposes.

BACKGROUND

A smartphone can use a touch panel as an input device instead of a physical keyboard. A touch panel may be an input device to sense the position of a touch made by a human finger or tool. Upon touching a desired point of a window member where an image is displayed, the touch panel recognizes the touched position and enables the electronic device to carry out a particular function.

There can be various types of touch panels, such as resistive, capacitive, infrared (IR), surface acoustic wave (SAW), electromagnetic (EM), and electromagnetic resonance (EMR).

A typical touch panel can include sensors for sensing contact of an input means (e.g., a finger or stylus pen). Connection lines connect the sensors to a controller. The controller detects a variation in the output of the sensors of the touch panel due to the contact of the input means and determines the position of the touch on the touch panel.

A touch panel may includes an array of independent sensors on one layer to recognize multiple simultaneous inputs.

Multiple connection lines for connecting the multiple sensors, when densely positioned, may deteriorate. The connection lines may be arranged between the sensors as well as in an array area, and thus, the inter-sensor gap may be increased. This may deteriorate the performance of the touch panel. An increase in the area of the window member may lead to an increase in the number of connection lines and result in an increased the inter-sensor gap.

The above information is presented as background information only to assist with an understanding of the present disclosure. No determination has been made, and no assertion is made, as to whether any of the above might be applicable as prior art with regard to the present disclosure.

SUMMARY

Various embodiments of the present disclosure relate to touch panels and electronic devices having the same.

According to an embodiment of the present disclosure, there are provided a touch panel that adopts an independent multi-input-enabling sensor scheme to present enhanced performance and an electronic device having the same.

According to an embodiment of the present disclosure, there are provided a touch panel that has a reduced inter-sensor gap to provide enhanced performance and an electronic device having the same.

According to an embodiment of the present disclosure, there are provided a touch panel that has an increased area of window member and is prevented from performance deterioration and an electronic device having the same.

According to embodiments of the present disclosure, a touch panel, comprises a window member; a first support provided on the window member and having a plurality of first sensors thereon; and a second support provided on the first support and having a plurality of second sensors thereon, the first sensors on the first support are separated by first gaps, and the second sensors on the second support are separated by second gaps.

According to embodiments of the present disclosure, a touch panel, comprises a window member; a first support provided at a side of the window member and having a plurality of first sensors and a plurality of first connection lines, thereon; and a second support provided at a side of the first support and having a plurality of second sensors and a plurality of second connection lines, thereon, wherein the plurality of the first sensors are separated by first gaps and the plurality of second sensors are separated by second gaps.

According to embodiments of the present disclosure, a touch panel, comprises a window member; a first support provided at a side of the window member and having a plurality of first sensors and a plurality of first connection lines, thereon; and a second support provided at a side of the first support and having a plurality of second sensors and a plurality of second connection lines, thereon, wherein the plurality of the first sensors are separated by first gaps and the plurality of second sensors are separated by second gaps.

According to embodiments of the present disclosure, a touch panel, includes a window member; a first support provided at a side of the window member and having a plurality of first sensors and a plurality of first connection lines, thereon; and a second support provided at a side of the first support and having a plurality of second sensors and a plurality of second connection lines, thereon, wherein the plurality of the first sensors are separated by first gaps and the plurality of second sensors are separated by second gaps.

According to embodiments of the present disclosure, an electronic device comprising a touch panel, which includes: a first layer having a plurality of first conductive sensors disposed below a window member; and a second layer spatially separated from the first layer and having a plurality of second conductive sensors, the first conductive sensors and the second conductive sensors being respectively positioned at different locations in a plane of the touch panel, wherein the second layer is disposed below the first layer, and the both layers are disposed over a display unit or at least one of both layers are integrated with the display unit.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
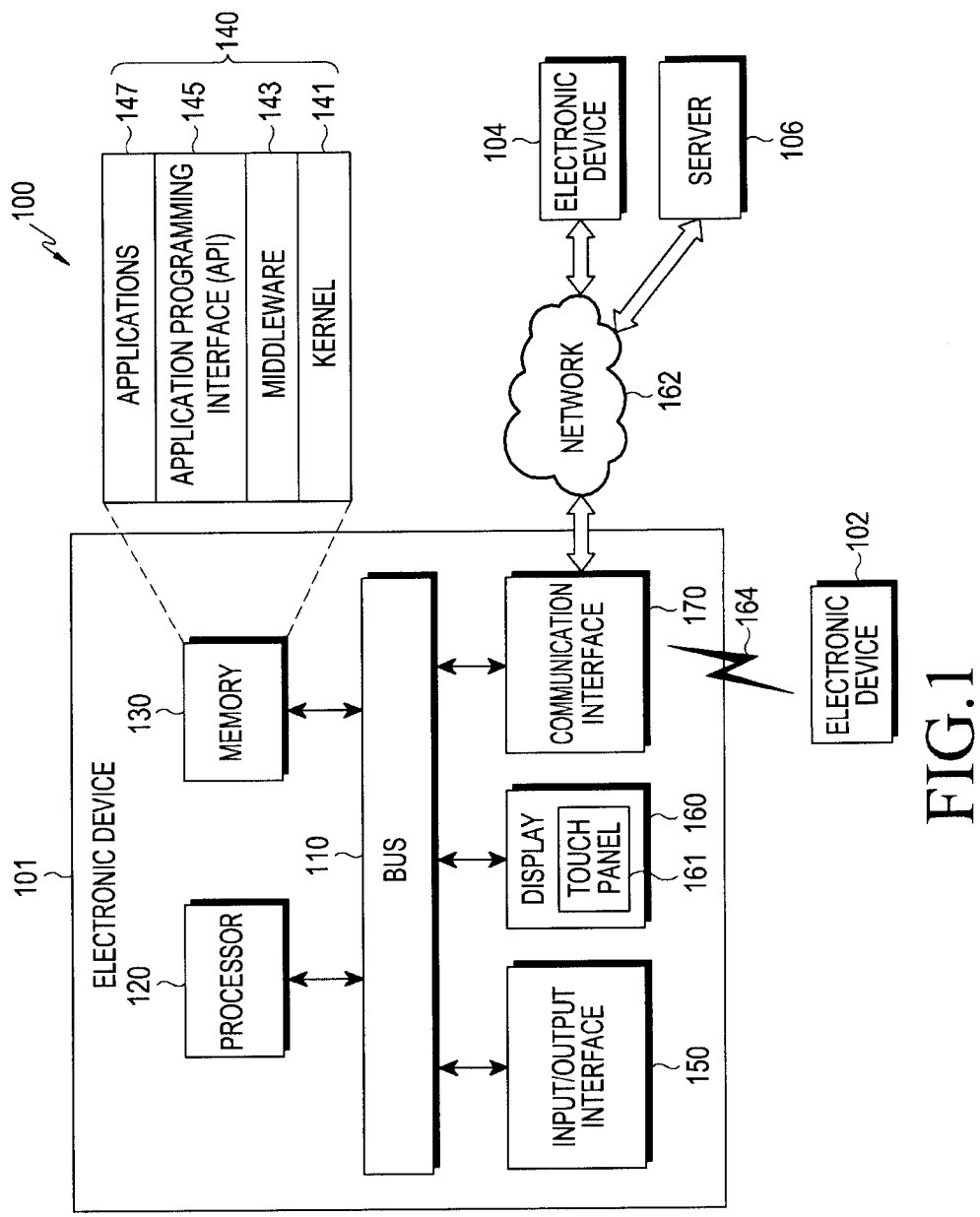
FIG. 1 is a view illustrating a network environment including an electronic device according to an embodiment of the present disclosure.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device may be a smart home appliance. For example, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV', or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touch panel 161. The touch panel 161 may receive, e.g., a touch, gesture, proximity or hovering input using an electronic pen or a body portion of the user. The touch panel 161 can include a window member and sensors as will be described in greater detail in FIGS. 4-13.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of, e.g., wireless fidelity (Wi-Fi), Bluetooth, near-field communication (NFC), or global positioning system (GPS). The wired connection may include at least one of, e.g., universal serial bus (USB), high definition multimedia interface (HDMI), recommended standard-232 (RS-232), or plain old telephone service (POTS). The network 162 may include at least one of telecommunication networks, e.g., a computer network (e.g., LAN or WAN), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
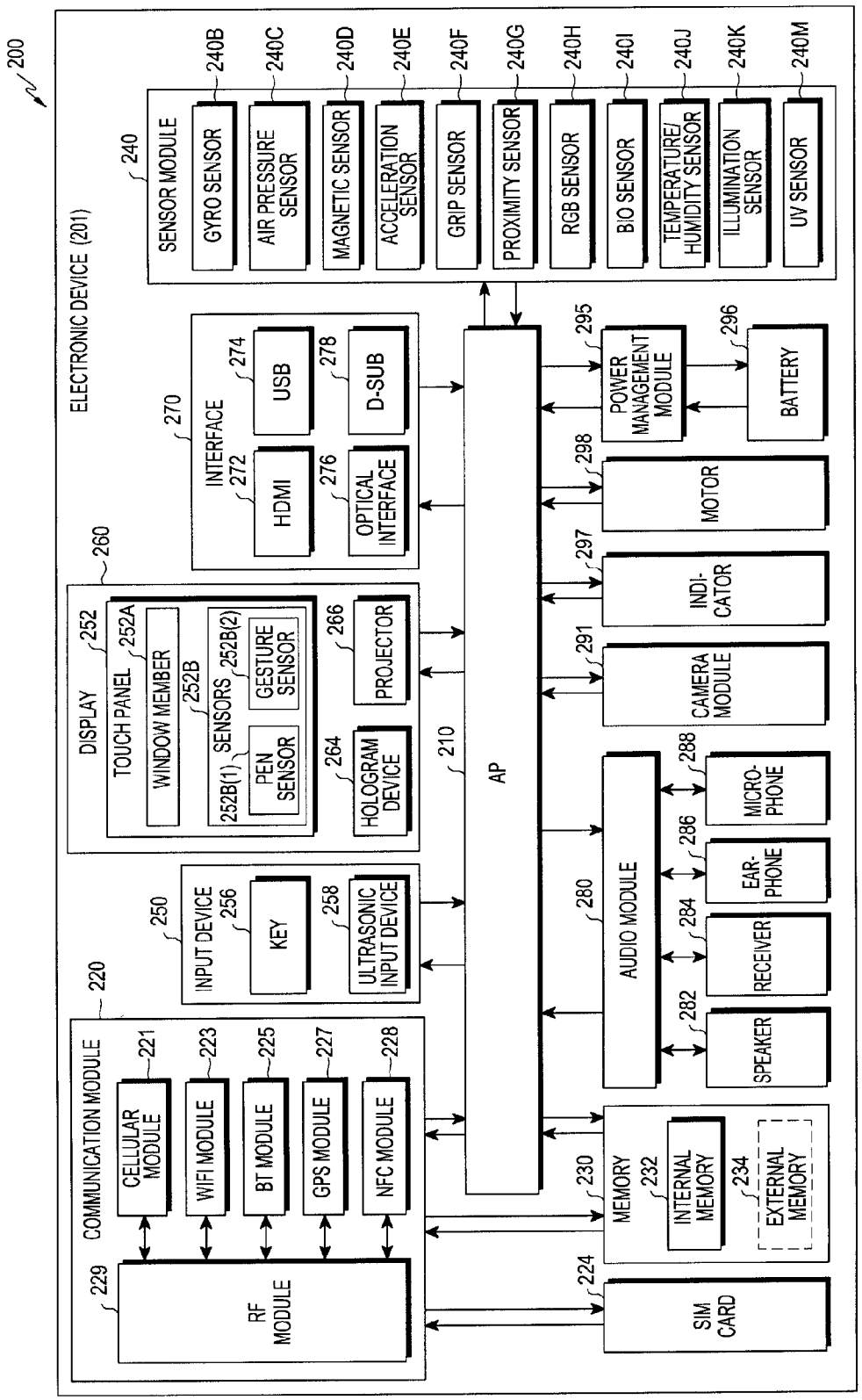
FIG. 2 is a block diagram illustrating an electronic device according to an embodiment of the present disclosure.

FIG. 2 is a block diagram illustrating an electronic device 201 according to an embodiment of the present disclosure. The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The term module can comprise memory storing executable instructions coupled to one or more processors such that the one or more processors are configured to execute the instructions. Multiple modules may use the same processor, or overlapping groups of one or more processors.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., a cellular module 221, a wireless fidelity (Wi-Fi) module 223, a Bluetooth (BT) module 225, a global positioning system (GPS) module 227, a near-field communication (NFC) module 228, and a radio frequency (RF) module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP).

The Wi-Fi module 223, the Bluetooth module 225, the GPS module 227, or the NFC module 228 may include a process for, e.g., processing data communicated through the module. At least some (e.g., two or more) of the cellular module 221, the Wi-Fi module 223, the Bluetooth module 225, the GPS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amplifier module (PAM), a frequency filter, an LNA (low noise amplifier), or an antenna. According to an embodiment of the present disclosure, at least one of the cellular module 221, the Wi-Fi module 223, the BT module 225, the GPS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally and/or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gyro sensor 240B, an atmospheric pressure sensor 240C, a magnetic sensor 240D, an acceleration sensor 240E, a grip sensor 240F, a proximity sensor 240G, a color sensor 240H (e.g., an red-green-blue (RGB) sensor, a bio sensor 240I, a temperature/humidity sensor 240J, an illumination sensor 240K, or an ultra violet (UV) sensor 240M. Additionally or alternatively, the sensing module 240 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a key 256, or an ultrasonic input device 258. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a touch panel 252, a hologram device 264, or a projector 266. The touch panel 252 may have the same or similar configuration to the display 160 of FIG. 1. The touch panel 252 may be implemented to be flexible, transparent, or wearable. The touch panel 252 may use at least one of capacitive, resistive, infrared, or ultrasonic methods. The touch panel 252 may further include a control circuit (not shown) and a tactile layer (not shown) and may provide a user with a tactile reaction.

Additionally, the touch panel 252 can include a window member 252A and sensors 252B. The sensors 252B can include a (digital) pen sensor 252B(1) and a gesture sensor 252B(2).

The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the touch panel 252, the hologram device 264, or the projector 266.

The interface 270 may include e.g., a High Definition Multimedia Interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a Mobile High-definition Link (MHL) interface, a secure digital (SD) card/multimedia card (MMC) interface, or IrDA standard interface.

The audio module 280 may convert a sound into an electric signal or vice versa, for example. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for capturing still images and videos, and may include, according to an embodiment of the present disclosure, one or more image sensors (e.g., front and back sensors), a lens, an image signal processor (ISP), or a flash such as a light emitting diode (LED) or xenon lamp.

The power manager module 295 may manage power of the electronic device 201, for example. Although not shown, according to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
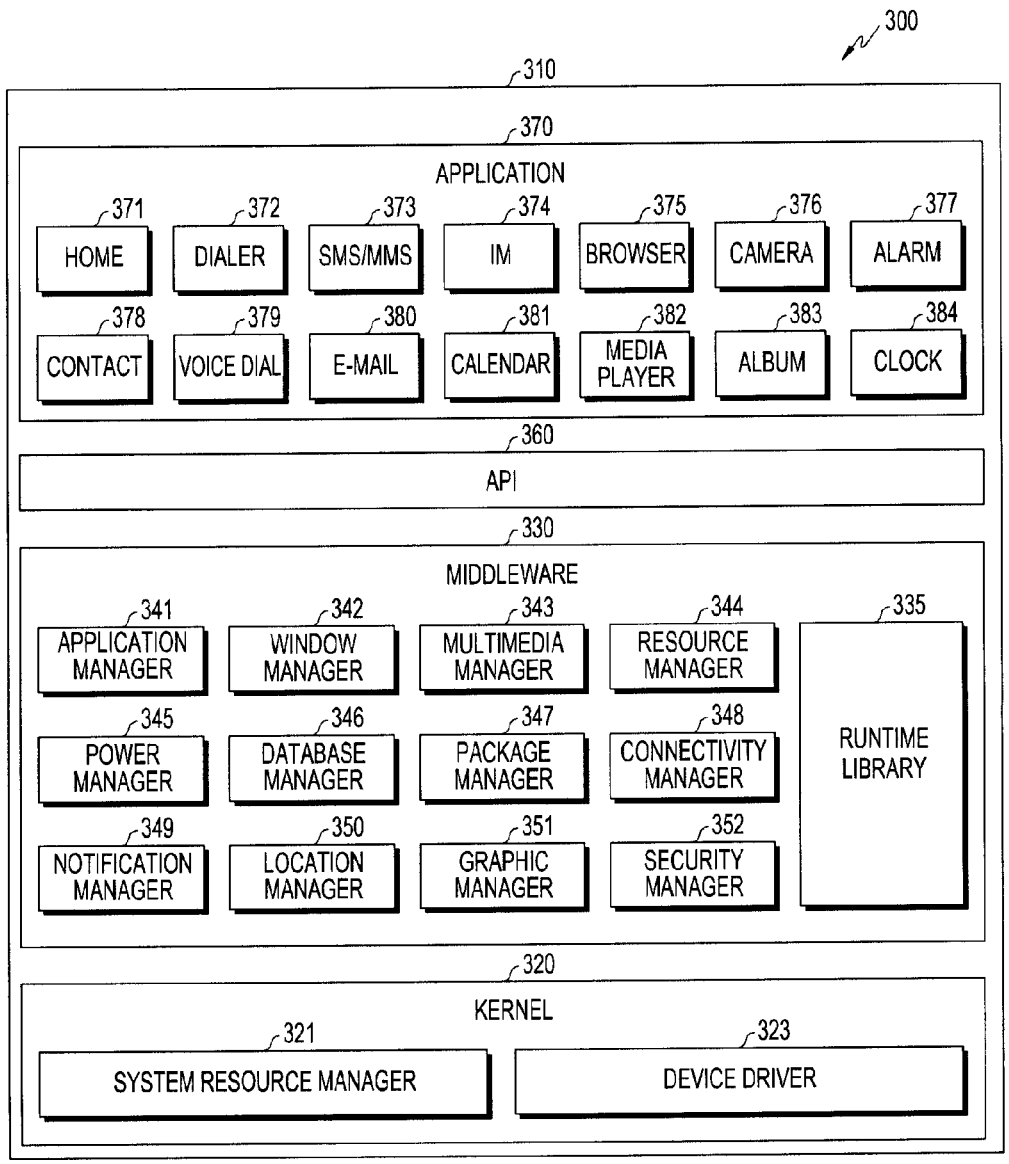
FIG. 3 is a block diagram illustrating a program module according to an embodiment of the present disclosure.

FIG. 3 is a block diagram illustrating memory 300. The memory 300 comprises programs 310 according to an embodiment of the present disclosure. According to an embodiment of the present disclosure, the programs 310 (e.g., the program 140) may include an operating system (OS) controlling resources related to the electronic device (e.g., the electronic device 101) and/or various applications (e.g., the application processor 147) driven on the operating system. The operating system may include, e.g., Android, iOS, Windows, Symbian, Tizen, or Bada.

The program 310 may include, e.g., a kernel 320, middleware 330, an application programming interface (API) 360, and/or applications 370. At least a part of the programs 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 273, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, healthcare application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a healthcare application of a mobile medical device) designated according to an attribute of the external electronic device (e.g., the electronic devices 102 and 104). According to an embodiment of the present disclosure, the application 370 may include an application received from the external electronic device (e.g., the server 106 or electronic devices 102 and 104). According to an embodiment of the present disclosure, the application 370 may include a preloaded application or a third party application downloadable from a server. The names of the components of the program module 310 according to the shown embodiment may be varied depending on the type of operating system.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the programs 310 may include e.g., a module, program, routine, set of instructions, process, or the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, Flash Memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

Figure 4:
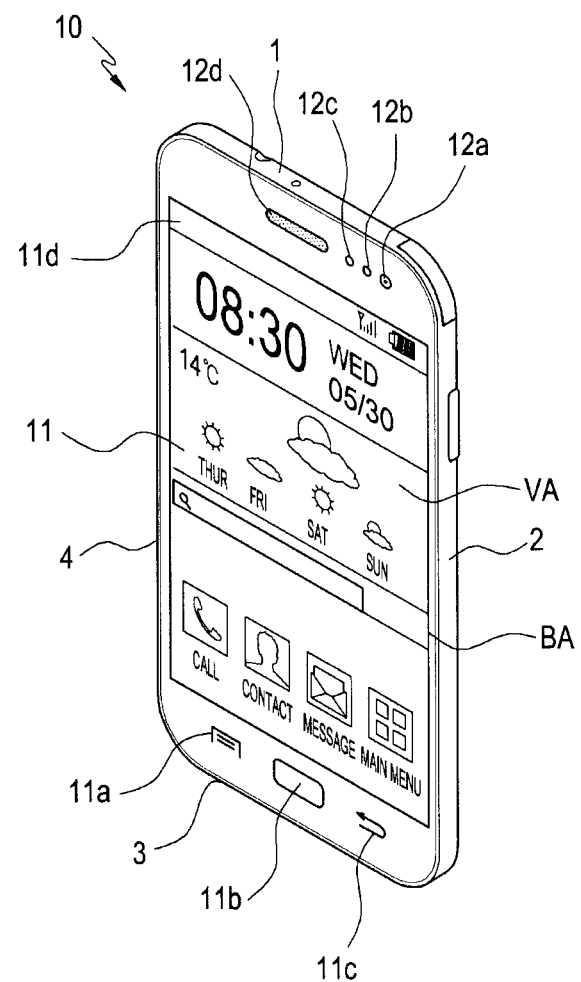
FIG. 4 is a front perspective view illustrating an electronic device having a touch panel according to an embodiment of the present disclosure.
Figure 5:
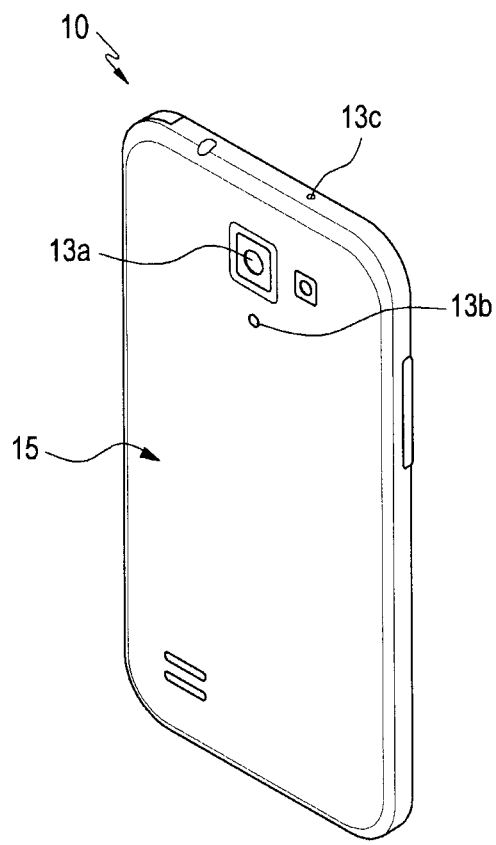
FIG. 5 is a rear perspective view illustrating an electronic device having a touch panel according to an embodiment of the present disclosure.

FIG. 4 is a front perspective view illustrating an electronic device, and FIG. 5 is a rear perspective view illustrating an electronic device. The electronic device may be a smartphone or a tablet PC. An electronic device, such as a smartphone, is described with reference to FIGS. 4 and 5.

Referring to FIG. 4, a display 11 may be provided at the center of the front surface of the electronic device 10. The display 11 may occupy most of the front surface of the electronic device 10. FIG. 4 illustrates an example in which a main home screen is displayed on the display 11. The main home screen is a screen that is first to be displayed on the display 11 when the electronic device 10 is powered on. When the electronic device 10 has several pages of different home screens, the main home screen may be the first one of the home screens. The home screen may show up on short-key icons, a main menu shifting key for running applications frequently used, time, and weather. The main menu shifting key may display a menu on the display 11. On the top of the display 11 may be provided a status bar 11d including battery recharge state, signal reception strength, and current time. A home key 11a, a menu button 11b, and a go-back button 11c may be provided on a lower portion of the display 11.

The home key 11a may display the main home screen on the display 11. For example, when the home button 11a is touched while the main home screen and other home screens or menu are in display on the display 11, the main home screen may show up on the display 11. When the home key 11a is touched while applications are running on the display 11, the main home screen may be displayed on the display 11. The home key 11a may be used to display applications recently used or a task manager on the display 11. The menu button 11b may provide a connection menu that may be used on the display 11. The connection menu may include an add widget menu, a change background menu, a search menu, an edit menu, and a setting menu. The go-back button 11c may display the screen displayed immediately before the screen currently in execution or may terminate the latest application used.

According to an embodiment of the present disclosure, a first camera 12a, an illumination sensor 12b, or a proximity sensor 12c may provide in an upper area of the front surface of the electronic device 10. A second camera 13a, a flash 13b or a speaker 13c may be provided in the rear surface of the electronic device 10. When the electronic device 10 is configured with a detachable battery, a battery cover may form the rear surface of the electronic device 10.

The electronic device described below may be any one of the above-enumerated laptop computer, net book, smartphone, tablet PC, Galaxy Tab™, and Ipad™.

A metal frame may wrap around the display to protect damage to the edge of the display.

Figure 6:
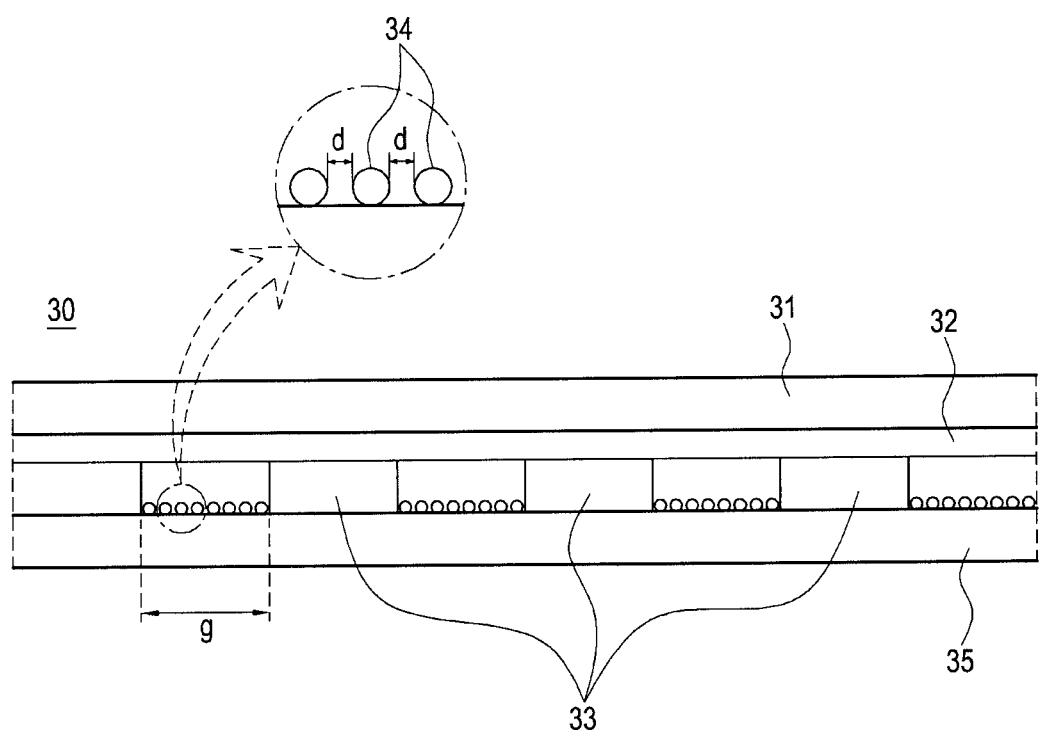
FIG. 6 is a cross-sectional view illustrating a touch panel.
Figure 7:
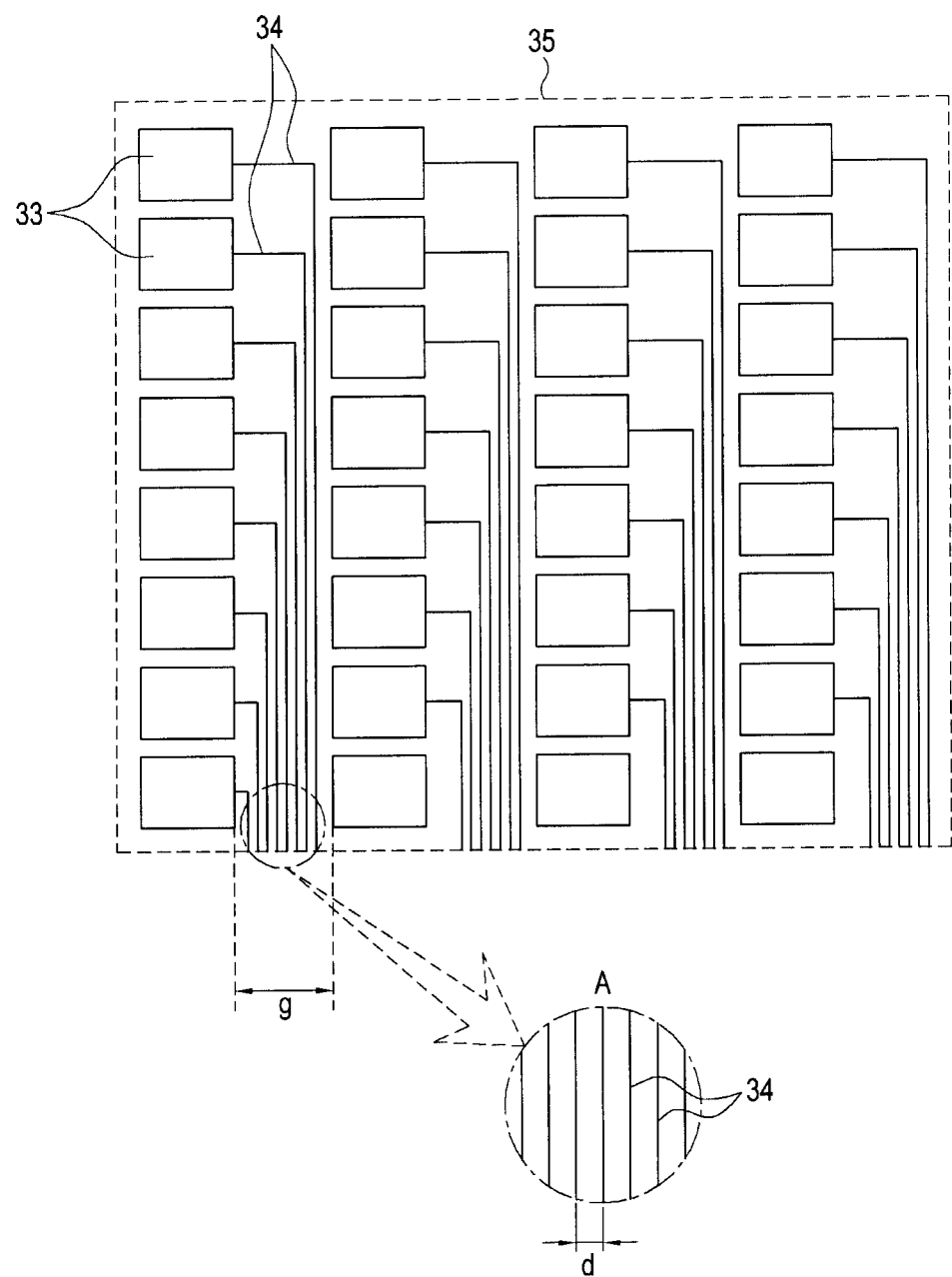
FIG. 7 is a plan view illustrating a touch panel.

FIG. 6 is a cross-sectional view illustrating a touch panel 30, and FIG. 7 is a planar view illustrating a touch panel 30. Referring to FIGS. 6 and 7, a touch panel 30 includes a window member 31, an attaching layer 32, a plurality of sensors 33, a plurality of connection lines 34, and a support 35. The touch panel 30 may be included in the display 160 shown in FIG. 1. The touch panel 30 may mean a panel that, without use of a separate input tool or device, such as a keyboard or mouse, may recognize the coordinates of a touch made on the screen by a human finger or object to enable a command for a software program designated to the touched position to be run to process a particular function.

The window member 31 may be formed of plastic or glass. The window member 31 may provide an area where projected image information can be seen through or a predetermined input means (e.g., a finger or touch pen) may be used. The attaching layer 32 may attach the window member 31 with the plurality of sensors 33.

The plurality of sensors 33 may detect a user's input. The plurality of sensors 33 may an X-directional position or Y-directional position with respect to the window member 31. The plurality of connection lines 34 may connect the sensors 33 with the processor (120 of FIG. 1). In other words, a signal input from the user may be transferred via the plurality of connection lines 34 to the processor (120 of FIG. 1). Such a touch panel 30 may recognize a user's multiple inputs by the plurality of sensors 33.

The touch panel 30 has the plurality of sensors 33 and thus may have an area A where the plurality of connection lines 34 are positioned densely as shown in FIG. 7. The dense area A may be subject to electromagnetic interference between electrical signals respectively from the plurality of connection lines 34, which may deteriorate the touch capability. Further, the plurality of connection lines 34 in the dense area A may be deteriorated and may be thus weakened.

In the dense area A, one connection line 34 and another connection line 34 may be spaced apart from each other at a predetermined first interval d. When the interval between one connection line 34 and another connection line 34 is smaller than the first interval d, the plurality of 34 may experience mutual interference or deterioration.

When the window member 31 of the touch panel 30 has an increased area, there are more connection lines 34 connecting the plurality of sensors 33 with one another, so that the area A may become denser with more connection lines 34. When the plurality of connection lines 34 are wired with the interval d maintained, a second interval g between one sensor 33 and another sensor 33 may be increased, and thus, the area where no user input can be recognized may become bigger, resulting in a performance deterioration of the touch panel. Such conventional touch panel 30 may have difficulty implementing a large-screen electronic device.

Figure 8:
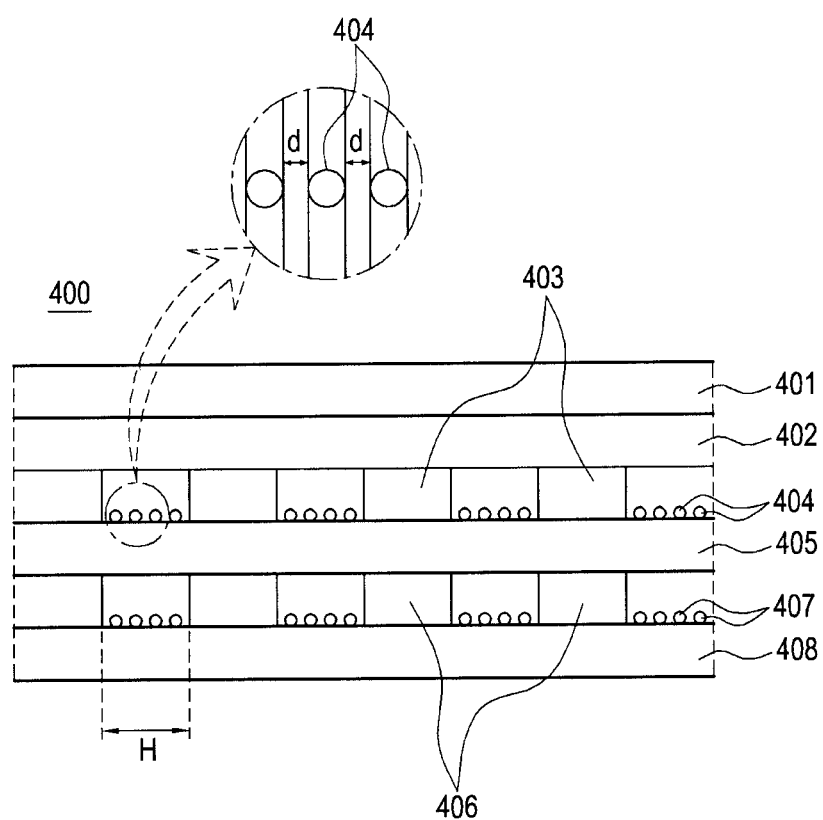
FIG. 8 is a cross-sectional view illustrating a touch panel according to an embodiment of the present disclosure.

FIG. 8 is a cross-sectional view illustrating a touch panel according to an embodiment of the present disclosure.

Referring to FIG. 8, according to an embodiment of the present disclosure, a touch panel 400 may include a window member 401, an attaching layer 402, a plurality of first sensors 403, a plurality of connection lines 404, a first support, a plurality of second sensors 406, a plurality of second connection lines 407, and a second support 408.

The window member 401 may be formed of transparent plastic or glass. The window member 401 may be formed of a flexible material (e.g., a film). The window member 401 may provide an area through which image information can be seen or a predetermined input means (e.g., a finger, touch pen, or a motion) may be used. The window member 401 may include a view area VA and a bezel area BA as shown in FIG. 4. The view area VA may be an area where image information may be projected or an input means may be used. The bezel area BA may be an area where the window member 401 fits and couples to the electronic device (10 of FIG. 4). The window member 401 corresponding to the bezel area BA may be formed of an insulating film. The insulating film may be a photosensitive organic insulating film.

The attaching layer 402 may attach the window member 401 with the plurality of sensors 403. The attaching layer 402 may be formed of a transparent material. The attaching layer 402 may include an insulating material. The attaching layer 402 may be formed of, e.g., an optical clear adhesive tape, an adhesive or sticking agent or an ultraviolet (UV)-cured resin.

The plurality of first sensors 403 are provided at a side of the window member 401 to detect a user's input. The first sensors 403 may sense a contact of an input means from a variation in capacitance, resistance, voltage, or current and transfer the user's input to the processor (120 of FIG. 1). A gap H may be formed between any two of the plurality of first sensors 403.

The plurality of first connection lines 404 may connect the first sensors 403 with the processor (120 of FIG. 1). The plurality of first connection lines 404 may be arranged at a side of the plurality of first sensors. A signal input from the user is transferred via the plurality of first connection lines 404 to the processor (120 of FIG. 1). The first connection lines 404 may be formed of at least any one of a transparent conductor or a conductive metal. The first connection lines 404 may be provided in the gap H.

The first support 405 may be provided at a side of the window member 401 and may have the plurality of first sensors 403 and power first connection lines 404. The first support 405 may be equipped with the plurality of first sensors 403 and the plurality of first connection lines 404 and support them. The first support 405, together with the plurality of first sensors 403 and the plurality of first connection lines 404, may be integrally formed into a module.

The plurality of second sensors 406 are provided at a side of the first support 405 to detect a user's input. Like the first sensors 403, the second sensors 406 may sense a contact of an input means from a variation in capacitance, resistance, voltage, or current and transfer the user's input to the processor (120 of FIG. 1). However, the second sensors 406 may sense a contact of an input means in a different manner from that of the first sensors 403. A gap H may be formed between any two of the plurality of second sensors 406. The gap H between the two of the plurality of second sensors 406 may be the same as the gap H between two of the plurality of first sensors 403.

The plurality of second connection lines 407 may connect the second sensors 406 with the processor (120 of FIG. 1). The plurality of second connection lines 407 may be arranged at a side of the plurality of second sensors 406. A signal input from the user may be transferred via the plurality of second connection lines 407 to the processor (120 of FIG. 1). The second connection lines 407 may be formed of at least any one of a transparent conductor or a conductive metal. The second connection lines 407 may be provided in the gap H.

The second support 408 may be provided at a side of the first support 405 and may have the plurality of second sensors 406 and power second connection lines 407. The second support 408 may be equipped with the plurality of second sensors 406 and the plurality of second connection lines 407 and support them. The second support 408, together with the plurality of second sensors 406 and the plurality of second connection lines 407, may be integrally formed into a module.

The touch panel has a plurality of sensors 33 and a plurality of connection lines 34 on one support 35 as shown in FIG. 6, and thus, the second interval between the plurality of sensors 33 may be broadened. In the instant embodiment, however, as the first and second supports 405 and 408 are provided to stack one over another, the gap H between the first or second sensors may be reduced. Further, in this embodiment, as the first and second connection lines 404 and 407 are separately arranged, and the first and second sensors 403 and 406 are separately arranged, the gap H may be further reduced as compared with the second interval g. In other words, two adjacent ones of the first sensors 403 or the second sensors 406 may be positioned closer to each other due to the reduced gap H. Some of the first connection lines 404 arranged in the gap H between the plurality of first sensors 403 may be relocated into the gap between the plurality of second sensors 407, and thus, the gap H may be further reduced.

As such, as the first sensors 403 and the second sensors 405 are stacked one over another in the touch panel 400 according to an embodiment of the present disclosure, the first and second connection lines 404 and 407 may be separately arranged. Accordingly, the first and second connection lines 404 and 407 may be prevented from being densely positioned. Further, as the gap H is reduced as compared with the second interval shown in FIG. 6, the area where no touch is sensed, an area under which there are no sensors, by the user may be shrunken.

Figure 9:
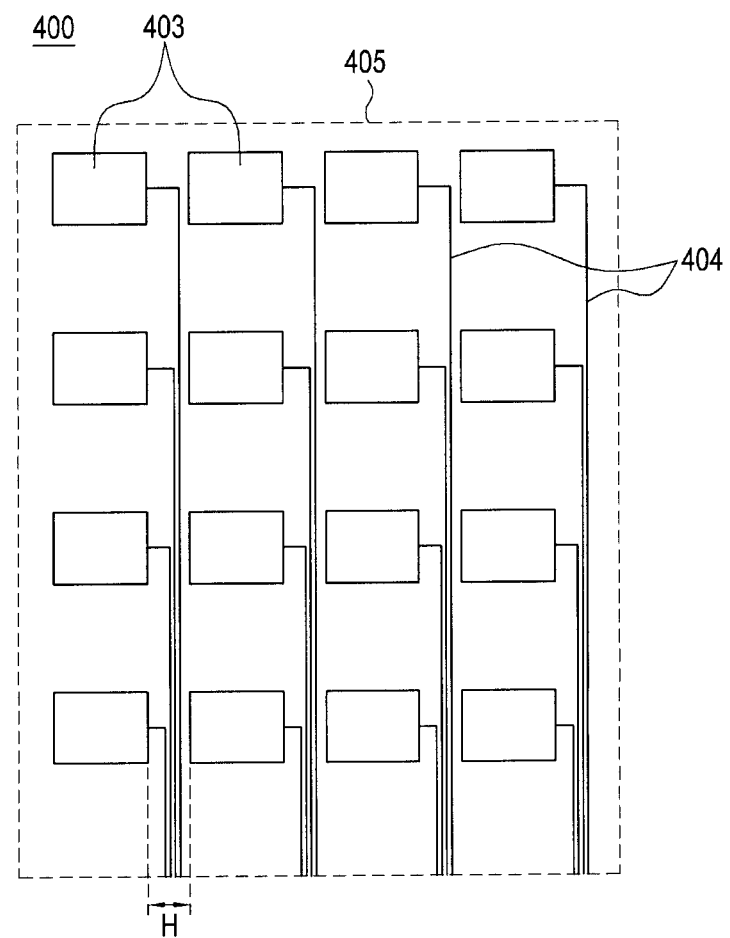
FIG. 9 is a plan view illustrating first sensors and first connectors of a touch panel according to an embodiment of the present disclosure.
Figure 10:
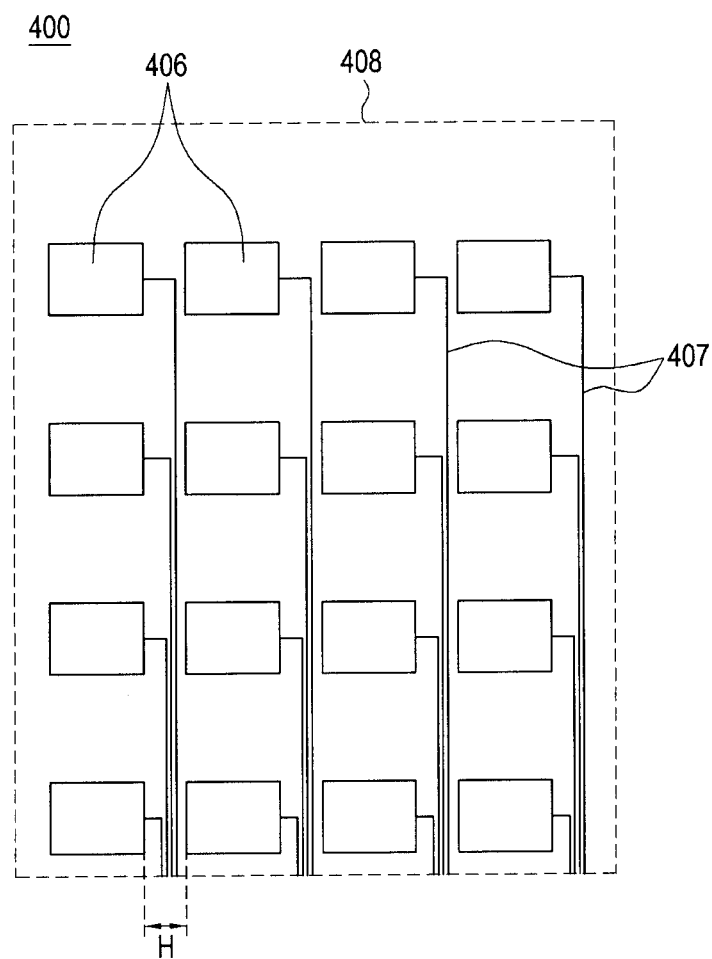
FIG. 10 is a plan view illustrating second sensors and second connectors of a touch panel according to an embodiment of the present disclosure.
Figure 11:
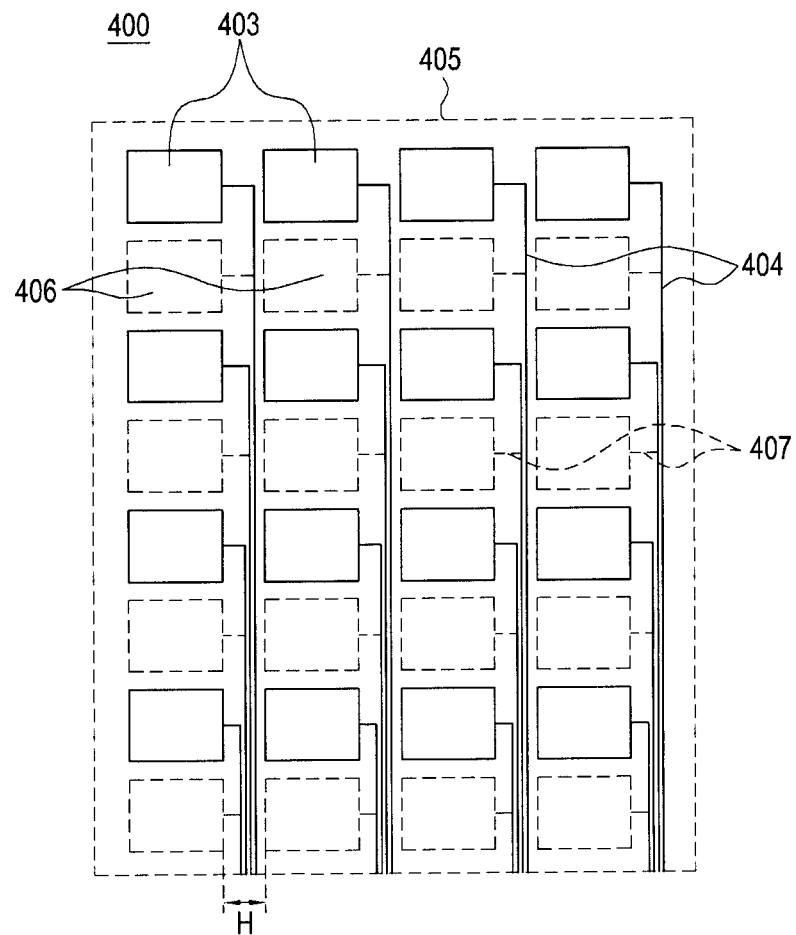
FIG. 11 is a plan view illustrating first sensors and second sensors of a touch panel according to an embodiment of the present disclosure.

FIG. 9 is a plan view illustrating first sensors and first connectors of a touch panel according to an embodiment of the present disclosure. FIG. 10 is a plan view illustrating second sensors and second connectors of a touch panel according to an embodiment of the present disclosure. FIG. 11 is a planar view illustrating first sensors and second sensors of a touch panel according to an embodiment of the present disclosure. A touch panel 400 according to an embodiment of the present disclosure is described in detail with reference to FIGS. 9 to 11.

Referring to FIGS. 9 and 10, the plurality of first sensors 403 and the plurality of first connection lines 404 may be arranged on the first support 405. The plurality of second sensors 406 and the second connection lines 407 may be arranged on the second support 408.

Particular ones of each of the first sensors 403 and each second sensors 406 may detect a position along a first axis parallel with a length direction of the window member (401 of FIG. 8). The first axis may be the geomtric X axis. The other particular one of each of the first sensors 403 and each of the second sensors 406 may detect a position along a second axis perpendicular to the first axis. The second axis may be the geomtric Y axis. However, the first sensors 403 and the second sensors 406 are not limited to detecting one of the first axis or the second axis, and alternatively, may simultaneously detect both the first and second axis.

Referring to FIG. 11, the each one of the plurality of second sensors 406 may be arranged corresponding to a space between different adjacent pairs of the plurality of first sensors 403. First lines (shown as dashed lines) extending from the respective ends of the plurality of second sensors 406 to the first support 405 may be spaced apart from the respective ends of the plurality of first sensors 403.

As the first support 405 and the second support are stacked one over another, each of the plurality of second sensors 406 projected to the first support 405 may be arranged between the different adjacent pairs of the plurality of first sensors 403. Accordingly, the first support 405 and the second support 408 may be rendered to have a reduced gap H between the first sensors 403 or between the second sensors 406. In other words, the first support 405 and the second support 408 may be stacked and coupled with each other and may have a reduced gap H between the first sensors 403 or between the second sensors 406.

According to an embodiment of the present disclosure, in the touch panel 400, the plurality of first sensors 403 and the plurality of second sensors 406 are separately arranged, preventing the plurality of first and second connection lines 404 and 407 from being densely positioned while reducing the gap H between the first sensors 403 or between the second sensors 406 projected to the window member 401.

In other words, the plurality of first connection lines 404 may be provided in the reduced gap H, and the plurality of second connection lines 407 may be provided in the reduced gap H.

Any one of a light emittians ng diode (LED), a switch, or an antenna may be provided in the reduced gap H.

Figure 12:
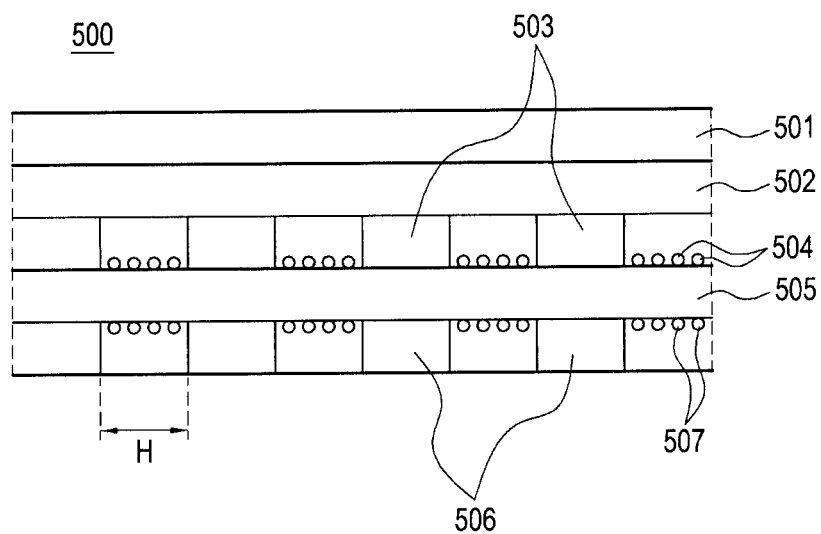
FIG. 12 is a side view illustrating a touch panel according to an embodiment of the present disclosure.
Figure 13:
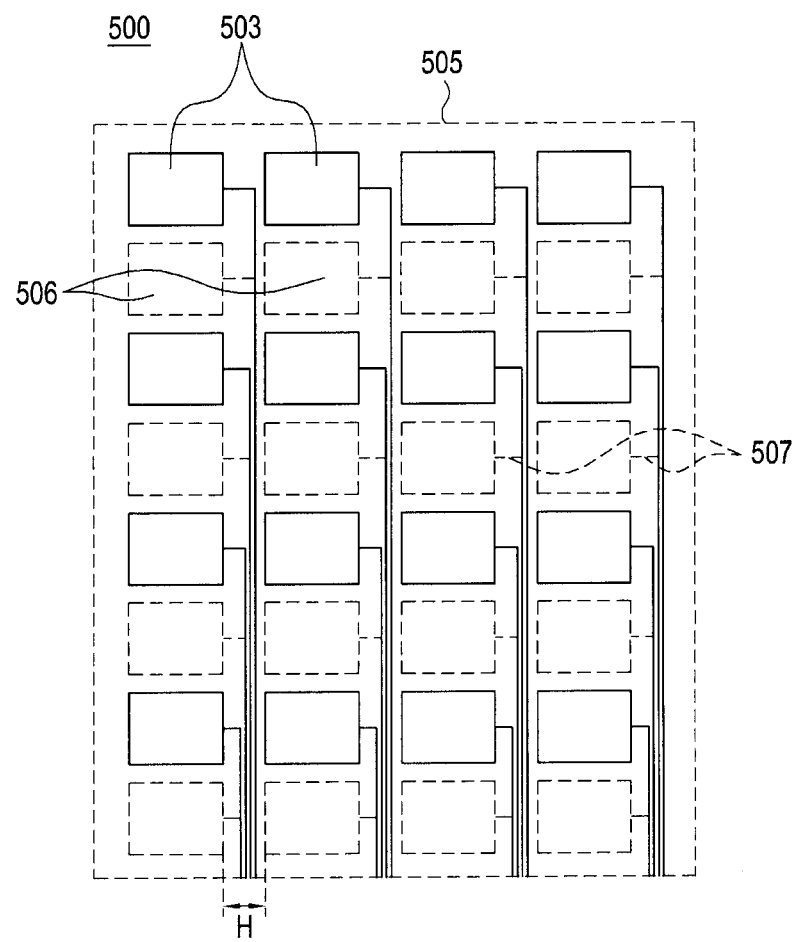
FIG. 13 is a plan view illustrating a touch panel according to an embodiment of the present disclosure.

FIG. 12 is a side view illustrating a touch panel according to an embodiment of the present disclosure, and FIG. 13 is a planar view illustrating a touch panel according to an embodiment of the present disclosure. Components similar to those described above in connection with the above embodiments are omitted from description. Referring to FIGS. 12 and 13, according to an embodiment of the present disclosure, the touch panel 500 may include a window member 501, an attaching layer 502, a plurality of first sensors 503, a plurality of first connection lines 504, a support 505, a plurality of second sensors 506, and a plurality of second connection lines 507.

The support 505 may be provided at a side of the window member 501.

The plurality of first sensors 503 may be provided in one surface of the support 505.

The plurality of second sensors 506 may be provided in another surface of the support 505. The plurality of second sensors 506 may be asymmetrically arranged with the plurality of first sensors 503 with respect to the support 505.

As such, in the touch panel 500 according to an embodiment of the present disclosure, the first and second sensors 503 and 506 are separately arranged in two opposite surfaces, respectively, of the support 505, and the gap H between the first sensors 503 or between the second sensors 506 may be reduced. In other words, a shrunken gap H may be provided between the first sensors 503 or between the second sensors 506.

According to an embodiment of the present disclosure, the touch panel 500 may include a plurality of first connection lines 504 and a plurality of second connection lines 507.

The plurality of first connection lines 504 may be provided in a surface of the support 505 to be connected with the plurality of first sensors 503. The plurality of first connection lines 504 may be provided in the reduced gap H.

The plurality of second connection lines 507 may be provided in another surface of the support 505 to be connected with the plurality of second sensors 506. The plurality of second connection lines 507 may be provided in the reduced gap H. The plurality of second connection lines 507 may be symmetrically arranged with the plurality of first connection lines 504 with respect to the support 505. A particular one of each first sensor 504 and each second sensor 507 may transfer a positional signal of a first axis parallel with a length direction of the window member 501. The other of each first sensor 504 and each second sensor 507 may transfer a positional signal of a second axis perpendicular to the first axis.

As such, in the touch panel 500 according to an embodiment of the present disclosure, the first and second connection lines 504 and 507 are separately arranged with respect to the support 505, the first and second connection lines 504 and 507 may be prevented from being positioned too densely.

As is apparent from the foregoing description, in the touch panel according to an embodiment of the present disclosure, the first sensor and the second sensor are disposed on different layers, so that the gap between the first sensor and the second sensor projected to the window member may be reduced. By the reduced gap between the first sensor and the second sensor projected to the window member, the performance of the touch panel may be enhanced. As the first connection line and the second connection line are disposed on different layers, the first and second connection lines may be prevented from being positioned close to each other, and they may be thus prevented from deterioration or interference. In the electronic device having the touch panel according to an embodiment of the present disclosure, despite an increased number of first and second sensors, the gap between the first sensor and the second sensor may be prevented from increasing, thereby leading to an increased area of window member.

The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

What is claimed is:
1. A touch panel, comprising:
a first layer having a plurality of first conductive sensors disposed below a window member;
a second layer spatially separated from the first layer and having a plurality of second conductive sensors, the first conductive sensors and the second conductive sensors being respectively positioned at different locations in a plane of the touch panel;
a plurality of first connection lines respectively connected to the plurality of first conductive sensors and a touch sensing IC and, the plurality of first connection lines disposed between the plurality of first conductive sensors; and
a plurality of second connection lines respectively connected to the plurality of second conductive sensors and the touch sensing IC and, the plurality of second connection lines disposed between the plurality of second conductive sensors,
wherein the second layer is disposed below the first layer, and the both layers are disposed over a display unit or at least one of both layers are integrated with the display unit,
wherein the plurality of second connection lines are disposed below the plurality of first connection lines, the plurality of second connection lines are arranged corresponding to the plurality of first connection lines.
2. A touch panel, comprising:
a window member;
a first layer having a plurality of first conductive sensors disposed below the window member;

a second layer spatially separated from the first layer and having a plurality of second conductive sensors, the first conductive sensors and the second conductive sensors being respectively positioned at different locations in a plane of the touch panel;

a plurality of first connection lines respectively connected to the plurality of first conductive sensors and a touch sensing IC and, the plurality of first connection lines disposed between the plurality of first conductive sensors; and a plurality of second connection lines respectively connected to the plurality of second conductive sensors and the touch sensing IC and, the plurality of second connection lines disposed between the plurality of second conductive sensors, wherein the plurality of second connection lines are disposed below the plurality of first connection lines, the plurality of second connection lines are arranged corresponding to the plurality of first connection lines.

3. The touch panel of claim 2, wherein the window member includes a view area and a bezel area around the view area, and wherein the plurality of first conductive sensors and the plurality of second conductive sensors are arranged corresponding to the view area.

4. The touch panel of claim 3, wherein the window member corresponding to the bezel area is formed of an insulating film.

5. The touch panel of claim 2, wherein the each of the plurality of second conductive sensors are arranged corresponding to gaps separating adjacent pairs of the plurality of first conductive sensors.

6. The touch panel of claim 5, wherein lines extending from the plurality of second conductive sensors and crossing the first layer are spaced apart from ends of the plurality of first conductive sensors.

7. The touch panel of claim 2, wherein a particular one of the plurality of first conductive sensors detects a position of one of a first axis parallel with a length direction of the window member and a second axis perpendicular to the first axis, and a particular one of the plurality of second conductive sensors detects a position of the other one of the first axis and the second axis.

8. The touch panel of claim 2, further comprising a plurality of first connection lines and a plurality of second connection lines are formed of at least one of a transparent conductor or a transparent conductive metal.

9. The touch panel of claim 2, further comprising the plurality of first connection lines are provided between the plurality of first conductive sensors and the plurality of second connection lines are provided between the plurality of first conductive sensors.

10. The touch panel of claim 2, wherein any one of a light emitting diode (LED), a switch, or an antenna is provided between the plurality of first conductive sensors or between the plurality of second conductive sensors.

11. An electronic device comprising:
a touch panel, said touch panel comprising:
a first layer having a plurality of first conductive sensors disposed below a window member;
a second layer spatially separated from the first layer and having a plurality of second conductive sensors, the first conductive sensors and the second conductive sensors being respectively positioned at different locations in a plane of the touch panel;
a plurality of first connection lines respectively connected to the plurality of first conductive sensors and a touch sensing IC and, the plurality of first connection lines disposed between the plurality of first conductive sensors; and
a plurality of second connection lines respectively connected to the plurality of second conductive sensors and the touch sensing IC and, the plurality of second connection lines disposed between the plurality of second conductive sensors,
wherein the second layer is disposed below the first layer, and the both layers are disposed over a display unit or at least one of both layers are integrated with the display unit,
wherein the plurality of second connection lines are disposed below the plurality of first connection lines, the plurality of second connection lines are arranged corresponding to the plurality of first connection lines.

12. A touch panel, comprising:
a first layer having a plurality of first conductive sensors disposed below a window member;
a second layer spatially separated from the first layer and having a plurality of second conductive sensors, the first conductive sensors and the second conductive sensors being respectively positioned at different locations in a plane of the touch panel;
a plurality of first connection lines respectively connected to the plurality of first conductive sensors and a touch sensing IC and, the plurality of first connection lines disposed between the plurality of first conductive sensors; and
a plurality of second connection lines respectively connected to the plurality of second conductive sensors and the touch sensing IC and, the plurality of second connection lines disposed between the plurality of second conductive sensors,
wherein the plurality of second connection lines are disposed below the plurality of first connection lines, the plurality of second connection lines are arranged corresponding to the plurality of first connection lines.

13. The touch panel of claim 12, wherein the plurality of second conductive sensors are asymmetrically arranged with the plurality of first conductive sensors.

14. The touch panel of claim 12, further comprising:
the plurality of first connection lines provided between the plurality of first conductive sensors and connected with the plurality of first conductive sensors; and
the plurality of second connection lines provided between the plurality of second conductive sensors and connected with the plurality of second conductive sensors.

15. The touch panel of claim 14, wherein the plurality of second connection lines are symmetrically arranged with the plurality of first connection lines.

16. The touch panel of claim 14, wherein a particular one of the first connection lines transfers a positional signal of a first axis parallel with a length direction of the window member, a particular one of the second connection lines transfers a positional signal of a second axis perpendicular to the first axis.

17. The touch panel of claim 14, wherein the first connection lines and the second connection lines are formed of at least one of a transparent conductor or a transparent conducive metal.

18. An electronic device including the touch panel of claim 12.

* * * * *